United States Patent [19]

Wright et al.

[11] Patent Number: 4,807,483

[45] Date of Patent: Feb. 28, 1989

[54] SLAT BELT FOR CENTRIFUGAL TEST ROTORS

[75] Inventors: Herschel E. Wright, Santa Clara; Lawrence E. Stahl, San Mateo, both of Calif.

[73] Assignee: Beckman Instruments, Inc., Fullerton, Calif.

[21] Appl. No.: 923,519

[22] Filed: Oct. 27, 1986

[51] Int. Cl.[4] .......................................... G01M 19/00
[52] U.S. Cl. .................................................. 73/865.3
[58] Field of Search ...................... 73/856, 827, 865.3; 494/10, 45, 68, 69, 85; 414/404, 414; 324/158 F

[56] References Cited

U.S. PATENT DOCUMENTS 4,685,853  8/1987  Roshala ............................... 494/85

OTHER PUBLICATIONS

Bulletin No. L5-TB-074 (Apr. 1980) "The Component-Test Bowl Rotor", Beckman Instruments, Inc.

Primary Examiner—John Chapman
Assistant Examiner—Robert R. Raevis
Attorney, Agent, or Firm—William H. May; Paul R. Harder

[57] ABSTRACT

A salt belt for insertion into a centrifugal test rotor is provided which is used to hold and contain a plurality of test components during mechanical testing. The slat belt is a flat polymeric belt which adhesively affixes a plurality of L-shaped slat members to its upper surface. When the belt is laid flat, it accommodates the easy positioning of components into channels. As the belt is curled for insertion into the test rotor, the slats move closer to one another and clasp the components into channels formed by adjacent pairs of radially directed slat arms. Upon completion of the test run, the slat belt is removed from the rotor and unrolled whereby the components are easily removed from the belt.

8 Claims, 1 Drawing Sheet

SLAT BELT FOR CENTRIFUGAL TEST ROTORS

BACKGROUND OF THE INVENTION

This invention relates to the field of centrifugal test rotors having article carrying adapters, and in particular to channel belts for carrying integrated circuit chip within a bowl shaped centrifugal test rotor.

Modern integrated circuits (ICs) are packaged in a compact ceramic or plastic structure to isolate the microelectronic circuitry contained therein, and ensure that the circuitry will perform under various operational environments. A properly designed IC package protects the microelectronics contained within the package from those environmental effects which tend to interfere with the reliable operation of the circuit. Depending on the intended use of the IC chip, the packaging requirements may be simple, such as when the IC chip will reside within a stationary household appliance. An extremely complicated IC chip package design may result where the circuit is intended for military or aerospace applications where it may be subjected to a variety of sever environmental conditions.

The IC chip package must therefore take into account electrical, thermal, chemical, magnetic, radiant, and mechanical conditions. The IC package must isolate and shield the electronic circuitry carried within the package. The packaging must provide a pathway to dissipate thermal energy generated within the circuit in a safe and nondestructive manner. The chip must be protected from chemical corrosion, external radiation, and external magnetic fields.

Mechanically, the packaging which surrounds the microelectronics contained within the IC chip must be strong enough to withstand stresses which occur during and after assembly and connection with other package circuits on a complex circuit board or system. These stresses include bending of the metal leads, dropping and soldering of circuits. During fabrication and operation, the IC package must withstand exposure to certain levels of shock, acceleration, vibration, welding heat, temperature cycling, moisture, and lead stress.

Various test have been designed to ensure that the IC package meets the design and operational criteria for a given intended-use environment. These tests sometimes include subjecting the IC package to acceleration and gravitational forces through the use of a centrifugal test rotor. The primary objective of the force is to insure integrity of the wire bonds. During manufacture very small wires are bonded at one end to pads on the chip and at the other end to the external package leads. Bonds of low integrity become disconnected under high gravitational forces imposed by centrifugation. Subsequent electrical testing then can identify faulty components.

Generally, the centrifugal test rotor is an open bowl-shaped rotor adapted to receive a flexible belt having a plurality of fixed walled, U-shaped compartments or channels for carrying IC chip components.

One or more integrated circuit packages were inserted into each fixed wall channel. Because the opposite pairs of leads in integrated circuits are not at precise 90° angles to the chip but are purposely manufactured to extend slightly outwardly, installation and removal forces are required to flex the chip leads to fit within the channels and to remove the chips from the channels after centrifugation. In the prior art designs, the fixed shape channel required the application of external stress to the electrical leads simply for the purpose of setting up the IC packages for centrifugal testing. Once the testing was completed, the belts had to be shaken or the IC packages pried out from the channels in order to release the chips from the belt.

What is needed is a belt designed for easy loading and unloading of test chips from the centrifugal test rotor, without placing additional stress on the leads in order to assemble the chips for testing.

SUMMARY OF THE INVENTION

A slat belt of improved design in disclosed which is adapted for insertion into a centrifuge test rotor for supporting and containing a plurality of integrated circuits or other articles of manufacture in order to test the circuits and articles for their mechanical strength under severe stress and acceleration conditions.

The slat belt may be flexed to conform to the inner diameter of a test bowl rotor and has secured thereto a plurality of radially inwardly directed slats side to side along the length of the belt. Each slat has a generally L-shaped cross-section formed by at least a pair of intersecting members.

The slat members of each slat intersect to define an inward right angle. One member is affixed to the belt and the other slat member is inwardly directed. The slats, by being L-shaped, rather than U-shaped, are constructed and arranged to hold components loosely when the belt is made to lie flat for component loading; and, as the belt is curled for placement within the test rotor, the upright members of adjacent pairs of slats move inward to grip and securely hold the test components.

The inwardly directed member of each slat has an outer wall which forms a convergent angle with its opposite inner wall (fixed at right angles to the other flat member). The convergent angle wall serves to form a substantial parallel shape with an inner wall of an adjoining slat when the belt is curled and placed within the test rotor. In this manner, a snug compartment is created which serves to secure the components during centrifugation while allowing their quick release upon removal of the belt from the rotor at the completion of testing.

DETAILED DESCRIPTION OF THE PREFERRED EMBODIMENT

Figure 1:
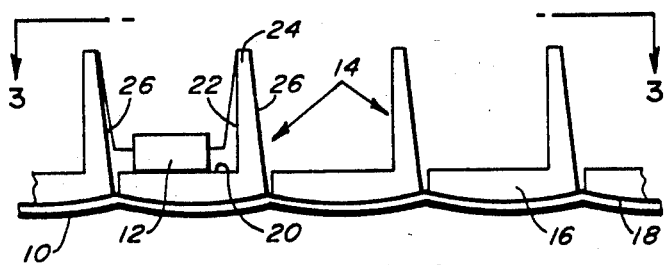
FIG. 1 is an elevational side view of a segment of the slat belt of this invention, showing the belt lying flat in an open position for loose insertion of electronic components for testing.

With reference to FIG. 1, the slat belt is shown lying flat in an open, resting position, ready for loading integrated components 12 or other articles of manufacture for testing. The belt 10 is thin and has a fiberglass-backing in the preferred embodiment. L-shaped slats 14 formed of a polymeric plastic have a horizontal first leg 16 and an upright second leg 24. Leg 16 is curved on its back side 18 and flat on its inside 20. The back side 18 of the slat is adhesively secured to the belt 10. The flat inside 20 of leg 16 is positioned to form a right angle with the inner surface 22 of the second leg 24. The outer surface 26 of the second leg 24 forms a convergent angle with surface 22, so that as the slat is curled, opposing inner walls (26 and 22) of FIG. 5 move inwardly to form a substantially parallel channel for holding the component 12 during centrifugation.

Figure 2:
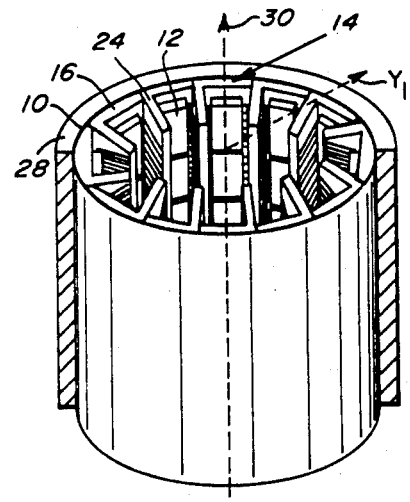
FIG. 2 is a perspective view showing the slat belt positioned within a component-test bowl rotor.
Figure 3:
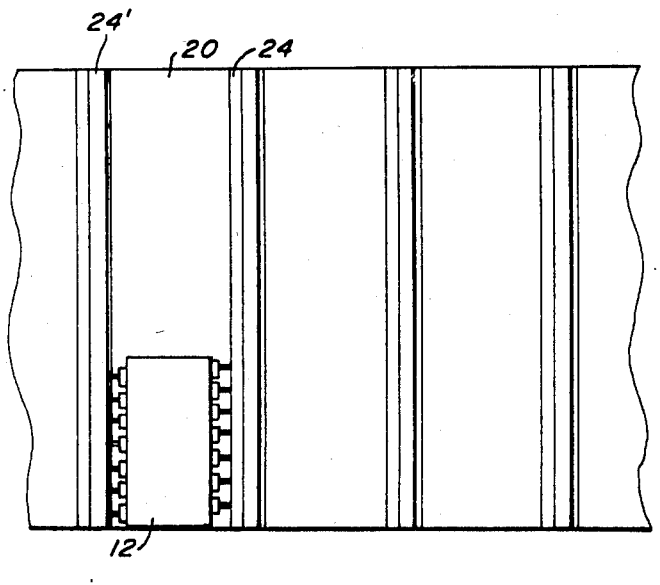
FIG. 3 is a top view of a segment of the slat belt shown in FIG. 1.

As FIG. 1 shows, when the slat belt 10 is opened and lying flat, each plastic slat 14 is sufficiently separated from one another such that an article of manufacture, such as integrated component 12, may be easily loaded and placed within the flat inside 20 of each slat. The angle of surface 26 is such that when the belt is flat the component will fit between these upright walls with very slight clearance or very light contact. After the components 12 have been symmetrically loaded onto the belt 10, within each of the slats 14, the belt 10 is carefully picked up and curled, end to end, for insertion in the centrifuge bowl rotor 28 (FIG. 2) As the belt is curled, the surfaces 22 and 26 pivot toward each other to put pressure upon the component's pins to secure the component in place and hold it securely as the belt is tipped to the vertical for insertion into the rotor. Once inserted within the inner wall of the rotor 28, each of the slats 14 stand vertically erect parallel to the axis of rotation 30 of the bowl rotor 28. As the rotor 28 spins, in the preferred embodiment, the components are tested in the $Y_1$ axis direction (a direction extending radially outward from the axis of rotation 30). With various other inserts or adapters, other directional forces may be placed upon the component.

Figure 5:
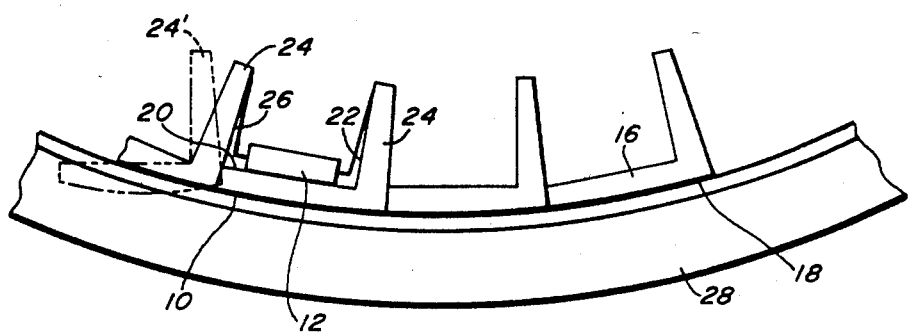
FIG. 5 is an elevational side view of a segment of the slat belt of this invention curled to form a cylindrical insert for placement in the bowl rotor, where a pair of slats are positioned to snugly support a test component during centrifugation.

The second leg 24 (of each of the individual slats 14 secured to the belt 10) move towards the next adjacent slat in a manner that the outer surfaces 26 of each leg 24 point inward radially towards the axis of rotation 30. Successive pairs of wall surfaces 26 and 22 (FIG. 5) form a substantially U-shaped channel with opposite walls substantially parallel during centrifugation to securely hold the test components 12 in place. With reference to FIG. 5, a segmented view of the slat belt 10 shows, in phantom, the approximate position of one slat 24' when the belt is flat and in full line in its position (24) after the belt has been curled. As is apparent, surface 26 moves closer to surface 22 of the adjacent slat to secure the component 12 within the channel formed by two adjacent slats.

As noted heretofore, the lower surface 18 is bowed (as in FIG. 1) so that when the belt 10 is curled and placed within the bowl rotor 28, the surfaces 18 conform to the inner circumference of the bowl rotor 28. After centrifugation, by removing the belt 10 from the rotor 28, one lies the belt 10 flat, as shown in Fig. 1, and the components 12 may be easily removed without resorting to special tooling to pry the test components 12 from the slats 14. In fact, by merely tipping the belt, the components may be dumped from the belt without any force at all.

Figure 4:
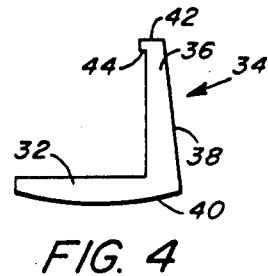
FIG. 4 is an alternative configuration of an individual slat according to the invention.

FIG. 4 shows an alternative embodiment of a slat 34, in which a lower leg 32 has a lower bowed surface 40 (to conform to the rotor bowl 28, like surface 18 of slat 14) and an upper leg 36 with a convergent surface 38. At the upper, inwardly radially directed end 42 of leg 36, is a cleft member 44, which acts to further secure components within a channel formed by a pair of adjacent slats. The cleft member 44 clutches the component 12 by one of its sets of extended wire prongs or leads (not shown) to secure the component 12 within the slat 34 during centrifugation. The embodiment also allows for quick release of components after centrifugation in the same manner hereinbefore described and exemplified in FIG. 1.

The foregoing description of the invention details one preferred description of what the applicant considers to be his invention. The appended claims are intended to cover the invention as disclosed and all equivalent configurations. For example, another embodiment of the invention might have cleft leg as in FIG. 4, but the cleft may be two-sided and overhanging both sides of leg 36. Therefore, the appended claims are intended to be construed in the broadest fashion commensurate with the full scope of claim interpretation allowed by law.

What is claimed:

1. A slat belt for insertion into a centrifugal test rotor, the slat belt adapted to support and contain a plurality of integrated circuits during centrifuge operation, said slat belt comprising:

a flat flexible belt which when rolled will conform in shape to the inner circumference of a centrifugal test rotor;

said belt securing a plurality of slats, each slat being positioned side to side along the length of said belt;

each slat having a generally L-shaped cross section, defined by a pair of intersecting members;

one of said members being affixed to said belt, and the other member extending radially inward such that a pair of adjacent slats move towards each other to contain integrated circuits as the belt is rolled and away from each other when the belt is laid out flat, whereby the integrated circuits are easily inserted into and removable from the belt.

2. The slat belt of claim 1 wherein said other member has convergent inner and outer walls.

3. The slat belt of claim 2 wherein said convergence is such that when the belt is rolled into a circle the inner wall of one slat is substantially parallel to the outer wall of the adjacent slat.

4. A slat belt as in claim 1 wherein said slat is adhesively secured to said belt.

5. A slat belt, adapted for insertion into a centrifugal test rotor, for supporting a plurality of articles, said belt comprising:

a flat continuous strip, suitable for insertion along the inner circumference of said test rotor when the strip is laid against said circumference, said strip carrying a plurality of substantially L-shaped slats, each slat having at least two integral members intersecting to form said L-shaped slat;

a first of said members being secured to the surface of said strip, the length of said member running along the width of said strip;

a second of said members being substantially orthogonal to said first member and extending inward radial when said strip is inserted into said rotor;

a least a pair of slats being positioned in juxtaposition so that when the strip is wound within the rotor body the pairs hold said articles securely, and when the strip is removed from the rotor after centrifugation, the articles are easily removed from the slats without the need to apply force to remove the articles.

6. The slat belt of claim 5, wherein said second member has an overhanging lip at its inwardly extending distal end.

7. A slat belt as in claim 5 wherein said slat is adhesively secured to said strip.

8. A slat belt as in claims 7 or 4, wherein each slat is made from polymeric material.

* * * * *